No. 792,042.

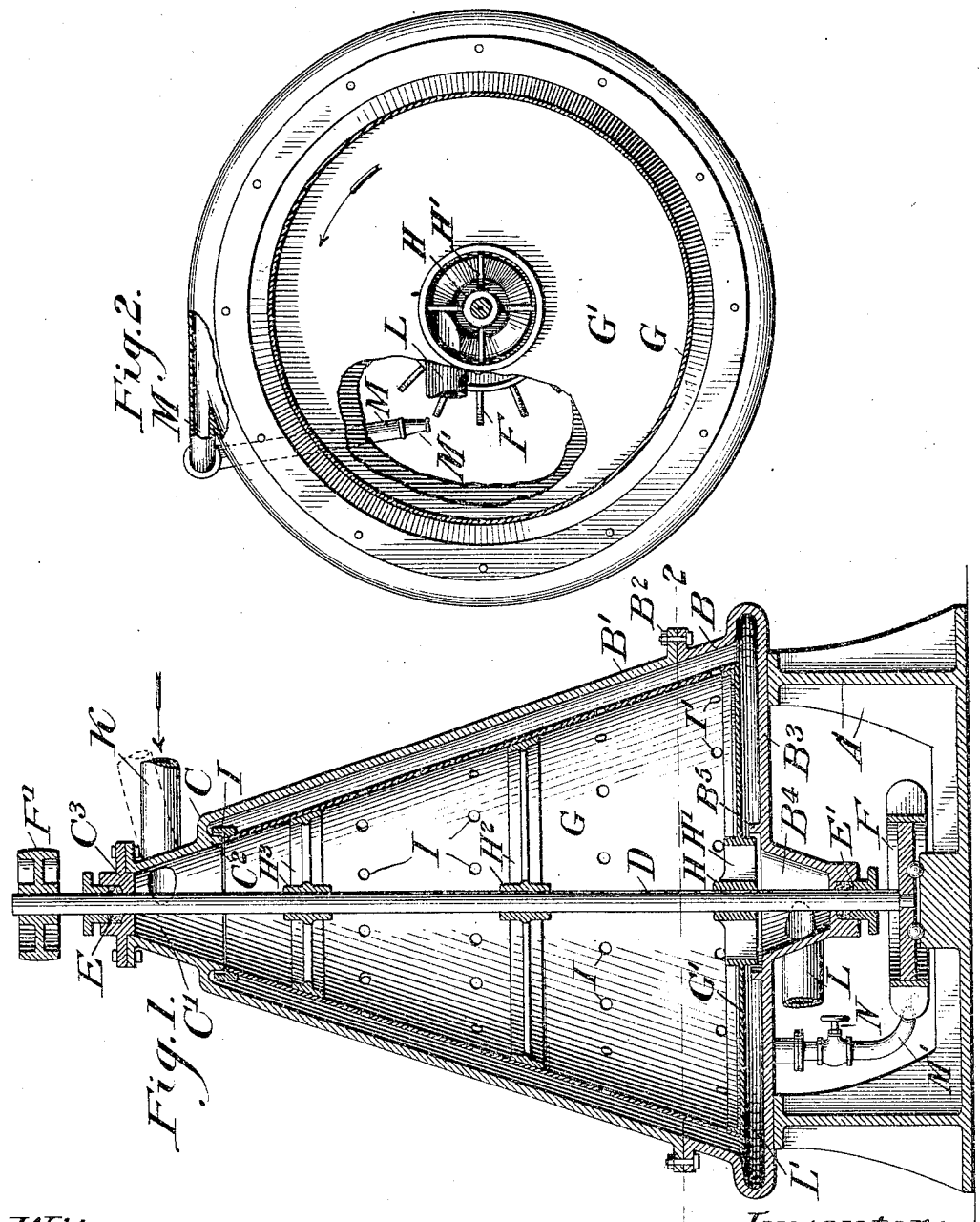

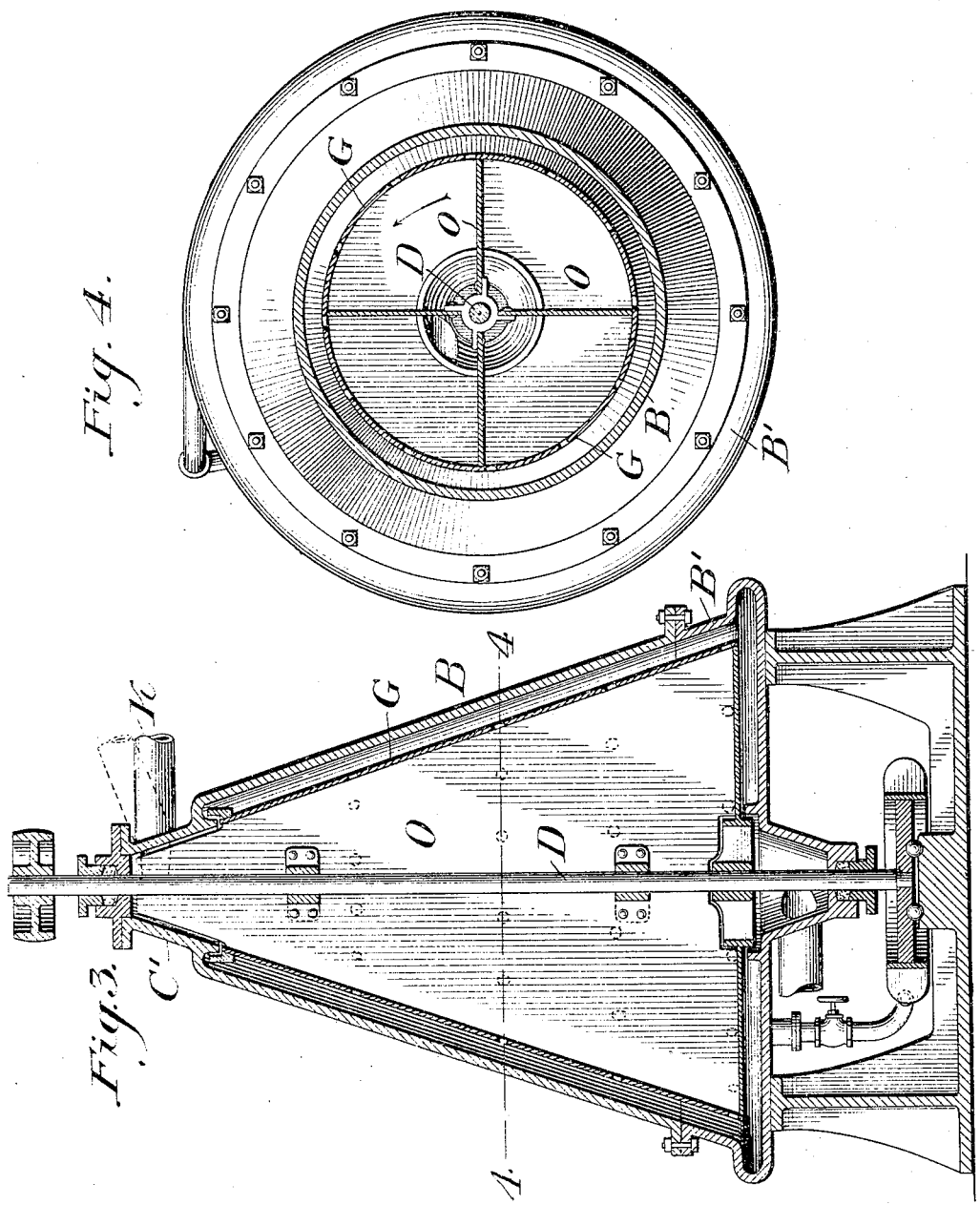

Patented June 13, 1905.

UNITED STATES PATENT OFFICE.

WILLIAM G. HOWELL, OF WASHINGTON, DISTRICT OF COLUMBIA.

CENTRIFUGAL MACHINE.

SPECIFICATION forming part of Letters Patent No. 792,042, dated June 13, 1905.

Application filed September 19, 1904. Serial No. 225,070.

*To all whom it may concern:*

Be it known that I, WILLIAM G. HOWELL, a citizen of the United States, residing at Washington, District of Columbia, have invented new and useful Improvements in Liquid-Purifying Apparatus, of which the following is a specification.

The object of this invention is to provide apparatus that will successfully purify very large quantities of water by centrifugal action. It involves the use of a closed outer vessel and a smaller rapidly-rotated inner vessel having circumferential perforations large enough to allow impurities to pass from the inner chamber to the annular chamber between the two vessels, a conduit delivering liquid in one end of the inner vessel, a conduit taking water from the inner vessel, and a conduit taking the separated impurities and a portion of the water from said annular space.

Other secondary objects and novel devices will hereinafter appear.

Preferably the two vessels are of conical form, water or other liquid to be purified being admitted at the smaller end. Preferably means are provided for regulating the flow of liquid and for utilizing the energy of both the entering and the discharged liquid for rotating the water in the vessels, and in some cases the interior of the inner vessel is divided into compartments extending from end to end, as will appear. The conical forms have been chosen for illustration, and for convenience in description the liquid to be purified will be spoken of as "water," the apparatus being, in fact, especially adapted for purifying water for municipal purposes or for large private consumers.

In the accompanying drawings, Figure 1 is an axial section of the apparatus; Fig. 2, a section on the line 2 2, Fig. 1; Fig. 3, a view similar to Fig. 1, showing a slight modification; and Fig. 4 is a section on the line 4 4, Fig. 3.

In Figs. 1 and 2, A represents a suitable stand or base, and B B' a conical closed vessel supported by the base and preferably made up of two parts, united in any suitable way—for example, by bolts $B^2$. Preferably the side walls turn abruptly inward at C and then extend onward again in the original direction, forming a neck from whose larger end an annular lip $C^2$ projects into the body of the vessel and whose smaller end is closed by a plate $C^3$. The side walls of the lower member B are bent sharply outward, forming a groove $B^2$, and are then integrally joined at the bottom $B^3$. This bottom has a central depression $B^4$, like the neck $C'$ inverted, and around this depression is an annular flange $B^5$. In the axis of the conical vessel is a shaft D, supported from the case by ball-bearings and passing through suitable stuffing-boxes E E' borne by the neck $C'$ and the corresponding part $B^4$. At its lower end the shaft bears a water motor-wheel F and at its upper end a belt-pulley F'. Within the vessel is a materially smaller very thin frustoconical receptacle G, open above, but closed below by a bottom G' and having its sides nearly continuous with the walls of the neck $C'$, parallel to the walls of the outer vessel and separated therefrom by an annular space due to the offset C. The bottom is provided with a central opening, surrounded by upwardly and downwardly projecting flanges and having within it a spider H H', rigidly connecting the bottom with the shaft D. Above the bottom are other spiders, $H^2 H^3$, connecting other portions of the side walls with the shaft, and at its upper end this receptacle is provided with an annular flange I, externally overlapping the lip $C^2$ of the neck. Water to be purified is admitted through a pipe K, which delivers it tangentially in the neck $C'$ and near the upper end of the latter. The entering water at once begins to travel downward in a slightly-inclined spiral with very little diminution of its initial velocity. The shaft being rotated by means of the belt-pulley, preferably at such speed that the upper part of the inner vessel has, as nearly as may be, the same rate of movement as the entering water, the water passes to the inner vessel without slip or material frictional loss, and its speed constantly increases as it passes toward the larger end of the cone, since the point most distant from the shaft must pass through its very long circular path while the shaft makes one revolution. As the water travels downward within the inner vessel the impurities seek the wall and pass out through small openings I, scattered over the lateral area and made large enough to allow any foreign material to pass outward. Preferably the bottom is also provided with like openings I' near its outer margin for the same purpose. The water escaping with the impurities through these apertures into the annular space surrounding the inner receptacle causes the pressure therein to be approximately the same as that within the receptacle, and hence the latter is subjected to very little strain and may be very light and though large may run at practically any desired speed. This impure water leaves the outer vessel at a very high speed through a tangential pipe M, provided with a valve N and terminating in any suitable nozzle M', which discharges the water against the blades of the motor-wheel F, thus utilizing practically its entire momentum in accelerating the rotation of that water which is following it. The pure water passes down through the central opening in the bottom of the inner receptacle and into the depression in the bottom of the outer vessel, whence it escapes tangentially through a conduit L, leading to any desired point. This water escaping so near the axis of rotation has a low velocity comparatively, and it is therefore not usually desirable to employ its momentum to assist in driving the apparatus.

The devices shown in Figs. 3 and 4 are precisely the same except that the space within the inner receptacle and the neck C' is divided into compartments by a series of radial partitions O, fixed to the shaft D. This compels the water in this space to rotate with the shaft D and prevents possible eddy-currents. It also utilizes the momentum of the entering water to assist in driving the shaft D, the partitions serving as the blades of a waterwheel. In either form of the device the inlet-pipe K may be downwardly inclined, as indicated in dotted lines, if desired.

It is evident that the construction and arrangement shown need not be closely followed. For example, the vessels which are shown as erect are not necessarily so, nor are the vessels or the neck and bottom depression necessarily conical, nor are the openings in the walls of the inner vessel the same in relative size, number, or location as in the drawings. In all these and in many other points the construction may be varied, and I do not, therefore, wish to confine myself to these specific forms, but wish to claim my invention broadly as well as specifically.

It is important to observe that the apparatus avoids all secondary currents and eddies that might carry the impurities back toward the pure water after they have moved outward, the matter in suspension in the outer annular space being protected by the perforated wall and the circular wall having little tendency to set up eddies by its rotary movement. While the impurities pass freely and constantly through the perforations, only so much water passes through all of them together as can be discharged through the nozzle, and obviously this may be such as to allow any desired flow through the openings.

What I claim is—

1. In a centrifugal liquid-purifier, the combination of a closed outer vessel for receiving separated impurities, an inner vessel mounted to rotate therein and provided with peripheral discharge-openings for permitting impurities to pass into the outer vessel, means for introducing liquid into one end of the inner vessel, a conduit leading from the inner vessel to the exterior of the outer vessel for discharging purified liquid therefrom and a second relatively small discharge-conduit leading from the outer vessel, whereby the outflow through the peripheral openings of the inner vessel is limited.

2. In a centrifugal liquid-purifier, the combination with a closed outer vessel having suitable outlet-openings, of a smaller, laterally-perforated vessel revolubly mounted in said outer vessel, means for introducing liquid in one end of the inner vessel and also means for discharging liquid centrally from the opposite end, and means for rotating the inner vessel.

3. In a centrifugal liquid-purifier, the combination of a closed outer vessel, a laterally-perforated inner vessel revolubly mounted in the outer vessel, means for introducing at one end of the inner vessel liquid to be purified, a conduit at the opposite end of the inner vessel for the discharge of purified water, a conduit for discharging separated impurities from the outer vessel, and means for rotating the inner vessel.

4. In a liquid-purifier, the combination of a closed outer vessel for receiving separated impurities, a laterally-perforated inner vessel mounted to rotate in the outer vessel, means for introducing liquid tangentially at one end of the inner vessel, a conduit for discharging pure water from the inner vessel, and a relatively small conduit for discharging impure water from the outer vessel.

5. In a water-purifier, the combination of a closed outer vessel, a laterally-perforated inner vessel mounted to rotate in the outer vessel, means for introducing tangentially at one end of the inner vessel liquid to be purified, a discharge-conduit leading tangentially from the opposite end of the inner vessel, and a relatively small conduit leading tangentially from the outer vessel.

6. In a centrifugal water-purifier, the combination of a vessel provided with a suitable inlet for water to be purified, a water-motor arranged to impart rotary motion to water in said vessel, and a conduit arranged to receive water discharged from said vessel and deliver it to said motor to actuate the same.

7. In a centrifugal liquid-purifier, the combination with a closed vessel, of a materially smaller, laterally-perforated vessel arranged to rotate in said closed vessel, a water-motor arranged to impart rotary force to the inner vessel, means for delivering in one end of the inner vessel water to be purified, a conduit for discharging water from the opposite end, and a valved conduit conveying peripherally-discharged water from the outer vessel to said motor, to actuate the latter.

8. In a centrifugal liquid-purifier, the combination of a closed outer vessel having at one end a central neck and at the opposite end a corresponding depression, a laterally-perforated inner vessel mounted to rotate in the outer vessel and adapted to receive liquid from said neck and discharge it into said depression, means for introducing liquid tangentially into said neck, and means for discharging a small portion of the entering water from the peripheral portion of the outer vessel.

9. In a centrifugal liquid-purifier, the combination of a closed outer vessel, a laterally-perforated inner vessel mounted to rotate in the outer vessel and divided into compartments by radial partitions, means for introducing water into one end of the inner vessel and for discharging water from the opposite end, and means for discharging a small part of the entering water from the peripheral portion of the outer vessel.

10. In a centrifugal liquid-purifier, the combination of a conical vessel adapted to contain a rapidly-rotating body of liquid, a laterally-perforated inner vessel mounted to rotate within the outer vessel, means for introducing liquid into the smaller end of the inner vessel, means for discharging liquid from its opposite end, and means for discharging liquid from the peripheral portion of the outer vessel.

11. In a centrifugal liquid-purifier, the combination of a closed outer vessel for receiving separated impurities, a conical inner vessel mounted to rotate within the outer vessel and provided with peripheral discharge-openings for permitting impurities to pass into the outer vessel, means for introducing liquid to be purified into one end of the inner vessel, means for discharging purified liquid from its opposite end, and means for discharging a small portion of the entering liquid, with its impurities, from the peripheral portion of the outer vessel.

12. In a centrifugal liquid-purifier, the combination with a closed conical outer vessel, of a conical, laterally-perforated inner vessel mounted to rotate in the outer vessel, means for introducing liquid into the smaller end of the inner vessel and for discharging liquid from its opposite end, and a conduit for discharging liquid from the peripheral portion of the outer vessel.

13. In a centrifugal liquid-purifier, the combination of a closed outer vessel for receiving separated impurities, a laterally-perforated conical inner vessel mounted to rotate in the outer vessel, means for introducing liquid tangentially in the smaller end of the inner vessel, means for discharging liquid from its opposite end, and means for discharging a relatively small portion of the entering water from the peripheral portion of the outer vessel.

14. In a centrifugal water-purifier, the combination of a closed conical outer vessel, a similar laterally-perforated inner vessel mounted to rotate in the outer vessel, means for introducing tangentially at the small end of the inner vessel liquid to be purified, and conduits at the opposite end of the apparatus leading tangentially from the inner and outer vessels, respectively.

15. In a centrifugal liquid-purifier, the combination of a closed outer vessel, a laterally-perforated conical inner vessel mounted to rotate in the outer vessel and divided into compartments by radial partitions, means for introducing liquid into the smaller end of the inner vessel and for discharging liquid from the opposite end, and means for discharging liquid from the peripheral portion of the outer vessel.

In testimony whereof I have signed my name to this specification in the presence of two subscribing witnesses.

WILLIAM G. HOWELL.

Witnesses:
 WALLACE GREENE,
 S. M. BROSIUS.